(12) United States Patent
Wang

(10) Patent No.: US 7,706,463 B2
(45) Date of Patent: Apr. 27, 2010

(54) METHODS AND APPARATUS FOR DECODING FRAME PACKET DATA IN A COMMUNICATION SYSTEM

(75) Inventor: Michael Mao Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 865 days.

(21) Appl. No.: 11/488,878

(22) Filed: Jul. 17, 2006

(65) Prior Publication Data

US 2008/0013636 A1  Jan. 17, 2008

(51) Int. Cl.
*H04B 7/02* (2006.01)

(52) U.S. Cl. .......................... 375/267; 455/132
(58) Field of Classification Search ................. 375/267; 455/132
See application file for complete search history.

(56) References Cited

U.S. PATENT DOCUMENTS

| | | | |
|---|---|---|---|
| 5,604,744 A | 2/1997 | Anderson et al. | |
| 6,498,936 B1 | 12/2002 | Raith | |
| 6,888,844 B2* | 5/2005 | Mallory et al. | 370/466 |
| 7,054,296 B1* | 5/2006 | Sorrells et al. | 370/338 |
| 7,164,732 B2* | 1/2007 | Chang et al. | 375/316 |
| 2001/0017904 A1* | 8/2001 | Pukkila et al. | 375/350 |
| 2002/0172162 A1 | 11/2002 | Goodings | |
| 2004/0081248 A1* | 4/2004 | Parolari | 375/259 |
| 2005/0030926 A1* | 2/2005 | Qian et al. | 370/335 |
| 2006/0039325 A1 | 2/2006 | Sebire | |
| 2007/0211661 A1* | 9/2007 | Tee et al. | 370/329 |
| 2008/0043613 A1* | 2/2008 | Yang et al. | 370/208 |

OTHER PUBLICATIONS

International Search Report—PCT/US07/073147—International Search Authority—European Patent Office—May 12, 2007.

* cited by examiner

*Primary Examiner*—Juan A Torres
(74) *Attorney, Agent, or Firm*—Stanton Braden

(57) ABSTRACT

Methods and apparatus for decoding frame packet data in a communication system to reduce latency for decoding particular types of broadcast signals in a frame. In particular, decoding of a communication signal includes demodulating at least a particular type of encoded broadcast channel modulation symbol received in a frame before completion of reception of a certain number of frames each including the particular type of encoded broadcast channel modulation symbol are received. After demodulation, the demodulated encoded broadcast channel modulation symbol is then decoded by a decoder. A determination is then made whether decoding of the first broadcast channel modulation symbol is successful. If decoding is successful, decoding of subsequent broadcast channel modulation symbols is terminated. Otherwise, decoding is incrementally or iteratively continued (i.e., a next received frame and so on) until decoding is determined to be successful.

48 Claims, 3 Drawing Sheets

METHODS AND APPARATUS FOR DECODING FRAME PACKET DATA IN A COMMUNICATION SYSTEM

BACKGROUND

1. Field

The present application relates to methods and apparatus for decoding frame packet data in a communication system and, more particularly, for incremental redundancy decoding of broadcast channel information within a wireless communication frame.

2. Background

In particular wireless communication systems, such as those operating according to the mobile broadband wireless access (MBWA) or IEEE 802.20, certain broadcast channel packets are encoded using a low effective coding rate to ensure reliable decoding of system parameters. In one example, the packets are convolutionally encoded (e.g., 1/3 convolutional encoding rate), channel interleaved, repeated, and quadrature phase shift keying (QPSK) modulated. These modulated symbols are transmitted over a predetermined P number of superframes in a preamble (e.g., a first symbol or beginning sequence of symbols) of each superframe. A typical number used for P is sixteen (16) superframes. The symbols may be an orthogonal frequency division multiplexed (OFDM) symbols or any other suitable communication system methodology. An example of these broadcast channel packets includes a pBCH0 packet, which is a broadcast channel that carries deployment specific parameters to be communicated to a mobile receiver (e.g., deployment-wide static parameters like cyclic prefix duration, number of guard carriers, and the superframe index) according to the IEEE 802.20 standard.

It is noted that in the IEEE 802.20 standard, in particular, pilot phase information, which is used for initial acquisition, is also contained in the preamble of each superframe and carries pseudorandom noise (PN) codes and overhead channels, such as an acquisition channel ACQCH and a broadcast channel OSICH. By obtaining the pilot phase information from these channels, the start of a pBCH0 packet may be determined where the relationship of pilot phase mod pBCH0 transmission period (P=16, for example)=0. In one example, the pilot phase information may be a number between 0 and 4,096. Thus, for example, for those pilot phase numbers divisible by P (e.g., 16) without a remainder, it may be known that this is the start of a pBCH0 packet.

In certain known receivers, the receiver is configured to wait until the start of the pBCH0 packet before receiving the modulation symbols. Once the start of a pBCH0 packet is determined, such receivers receive all the modulation symbols transmitted over the P (16) superframes and then combine them, accordingly. With such receivers, however, the receiver must wait for at least 16 superframes before starting demodulation and decoding of the pBCH0 packets. Thus, the start of demodulation and decoding of further broadcast channel packets, such as a pBCH1 packet, which contains information such as forward link hopping patterns, pilot structure, control channel structure, and transmit antennas, and must be demodulated and decoded after demodulation and decoding of pBCH0 is delayed.

SUMMARY

According to an aspect of the present disclosure, a method is disclosed for decoding a communication signal. The method includes demodulating at least a first type of encoded broadcast channel modulation symbol received in a first communication signal frame of a plurality of frames prior to receiving the entire plurality of frames, where each of the plurality of frames includes the first type of encoded broadcast channel modulation symbols. The method further includes decoding the first type of encoded broadcast channel modulation symbol, and determining whether decoding of the first type of broadcast channel modulation symbol is successful. Finally, the method includes terminating decoding of subsequent broadcast channel modulation symbols of the first type of encoded broadcast symbol when decoding is determined to be successful.

In another aspect, a processor is disclosed for decoding a communication signal. The processor is configured to demodulate at least a first type of encoded broadcast channel modulation symbol received in a first communication signal frame of a plurality of frames prior to receiving the entire plurality of frames, where each of the plurality of frames includes the first type of encoded broadcast channel modulation symbols. The processor is further configured to decode the first type of encoded broadcast channel modulation symbol, and to determine whether decoding of the first type of broadcast channel modulation symbol is successful. The processor is also configured to terminate decoding of subsequent broadcast channel modulation symbols of the first type of encoded broadcast symbol when decoding is determined to be successful.

According to yet another aspect, a processor for use in a transceiver is disclosed. The processor includes means for demodulating at least a first type of encoded broadcast channel modulation symbol received in a first frame of a plurality of frames prior to receiving the entire plurality of frames, where each of the plurality of frames includes the first type of encoded broadcast channel modulation symbols. The processor also includes means for decoding the first type of encoded broadcast channel modulation symbol. Finally, the processor further includes means for determining whether decoding of the first broadcast channel modulation symbol is successful, and means for terminating decoding of subsequent broadcast channel modulation symbols when decoding is determined to be successful.

In still another aspect, a computer-readable medium encoded with a set of instructions is disclosed. The instructions include an instruction for demodulating at least a first type of encoded broadcast channel modulation symbol received in a first communication signal frame of a plurality of frames prior to receiving the entire plurality of frames, where each of the plurality of frames includes the first type of encoded broadcast channel modulation symbols. The instructions also include an instruction for decoding the first type of encoded broadcast channel modulation symbol, and an instruction for determining whether decoding of the first type of broadcast channel modulation symbol is successful. Finally, the instructions include an instruction for terminating decoding of subsequent broadcast channel modulation symbols of the first type of encoded broadcast symbol when decoding is determined to be successful.

DETAILED DESCRIPTION

For the present disclosed apparatus and methods, it has been recognized that the previously discussed pBCH0 modulation and coding scheme is designed for the worst reception scenarios, such as users at the edge of a cell or in a shadow, to ensure reliable reception even in the worst case. To reduce the latency of decoding a pBCH0 packet for average users, the present disclosed methods and apparatus employ an incremental redundancy decoding scheme for decoding the pBCH0 packet where demodulation and decoding is constituted to begin before receiving all 16 of the pBCH0 packets.

Figure 1:
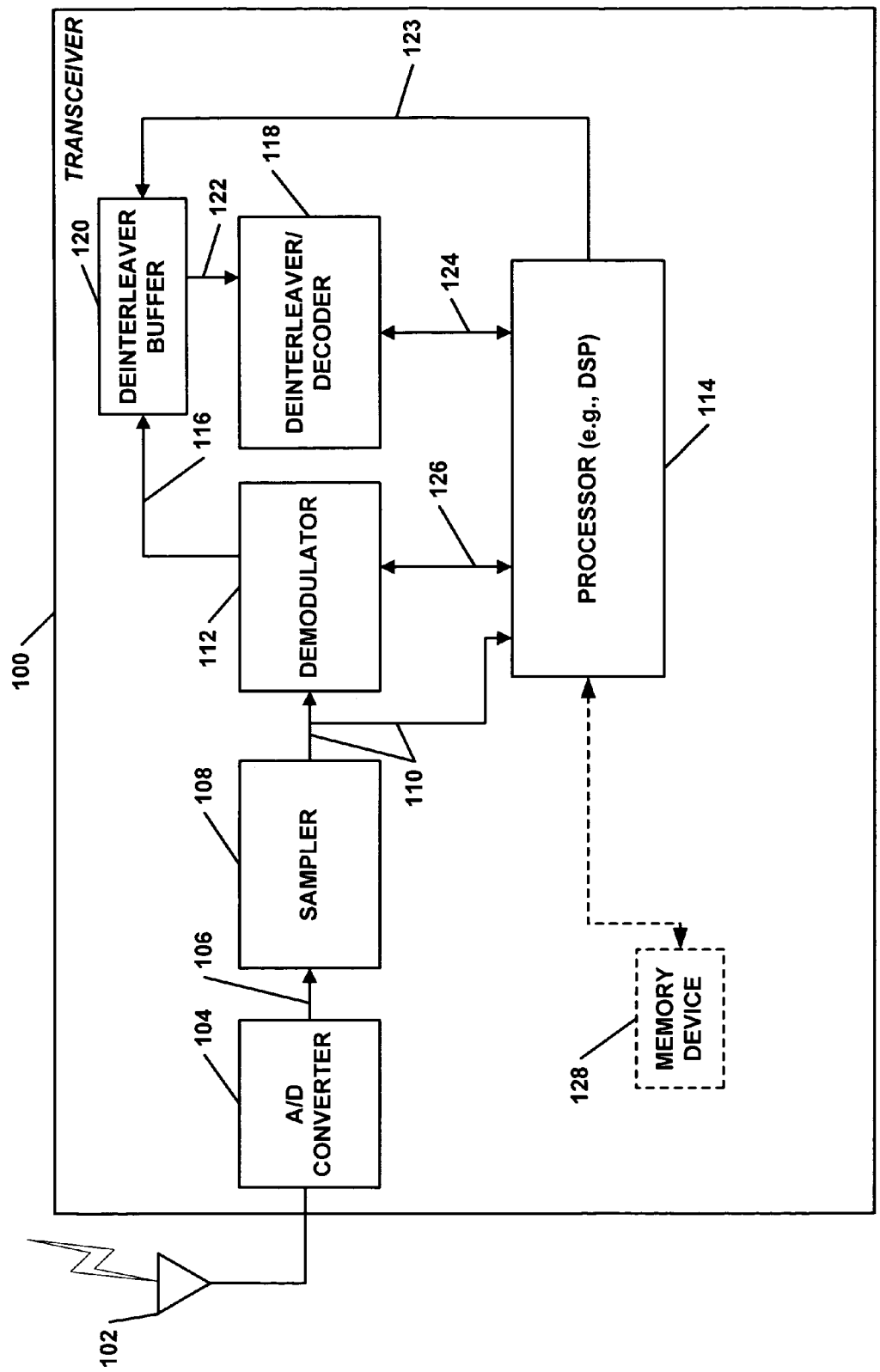
FIG. 1 is a block diagram of an exemplary transceiver that demodulates and decodes communication packet frame data according to the present disclosure.

FIG. 1 illustrates an exemplary transceiver or processor for use in a transceiver employing the presently disclosed methodology for demodulating and decoding pBCH0 packet frame data. As illustrated, transceiver 100 (or processor for use in a transceiver) is in communication with an antenna 102 for receiving communication signals. Once the communications signals are received by antenna 102, they are delivered to an analog to digital converter 104 for conversion of the analog signals to digital signals. The resultant digital signals 106 are passed to a sampler 108. The sampler 108 is the portion of the transceiver 100 that effects the actual timing window for sampling sub-carrier frequencies within the signal 104 from converter 102. The output 110 of sampler 108, which is a synchronized digital signal, is input to both a demodulator 112 and a processor 114, which may be a digital signal processor or any other suitable processor.

The output of demodulator 112 is a demodulated signal of coded symbols, which is input via a communication connection 116 to a deinterleaver/decoder 118 via a deinterleaver buffer 120 for decoding. The decoding performed is dependent on the encoding, which may be any one of a number of known encoding schemes known in the art. Coded symbols from demodulator 112 are combined with values previously stored in the deinterleaver buffer 120, as will be discussed in more detail below.

In operation, received communication signals, such as those in the format of a superframe, may be immediately processed, rather than waiting for the starting superframe of the 16 pBCH0 symbols and for all 16 pBCH0 OFDM symbols to be received. As part of this process, the processor 114 acquires the acquisition channel ACQCH and the broadcast channel OSICH from received superframes, via sampler 108 and connection 110, to obtain timing and pilot phase information. Once a pBCH0 OFDM symbol is received, transceiver 100 may be configured to start processing of the symbols (i.e., demodulation and decoding) immediately (or after a prescribed number of received symbols less than the full 16 pBCH0 OFDM symbols as another alternative). More particularly, the demodulator 112 demodulates a first received pBCH0 OFDM symbol to obtain the coded symbols. Demodulator 112 then inputs these coded symbols to the deinterleaver buffer 120, which is initially cleared to values of zero under the direction of processor 114 via a communication connection 123, as shown in FIG. 1. Deinterleaver buffer 120 combines the coded symbols from demodulator 112 with the coded symbols stored in the deinterleaver buffer 120 according to the coded symbol position based on the current pilot phase as determined from the acquisition channel ACQCH and broadcast channel OSICH. In the case where demodulation is immediately performed, the values in buffer 120 will be zero and combining the coded symbols with a zero value will, thus, simply yield the coded symbols.

For each superframe received, the pBCH0 packet modulation symbols are demodulated by demodulator 112, with the resultant coded symbols being combined with the coded symbols stored in the channel deinterleaver buffer 120 based on the coded symbol position, which is based on the current superframe pilot phase as determined from the initial acquisition. Deinterleaver buffer 120 passes the resultant combined coded symbols to deinterleaver/decoder 118 via a communication bus 122 (and may be directed to do so under the direction of processor 114 via communication connection 123).

A deinterleaving portion of the deinterleaver/decoder 118 deinterleaves the coded symbols received from deinterleaver buffer 120. A decoder portion of the deinterleaver/decoder 118 then decodes the deinterleaved symbols based on the coding scheme used to encode the symbols. It is noted here that although the functions of deinterleaving and decoding are shown as accomplished by a singular unit 118, one skilled in the art will appreciate that these functions may be accomplished by separate units in the alternative.

After decoding and deinterleaving by deinterleaver/decoder 118, processor 114 receives the decoded symbols via a bus connection 124 and determines if decoding is successful. An example of a scheme for determining whether decoding is successful is use of a cyclic redundancy check (CRC). If decoding is successful as determined by the CRC, for example, processor 114 may then signal demodulator 112 via a communication connection (e.g., 126) to terminate decoding and demodulating channel pBCH0 and start the demodulation and decoding of pBCH1 packets.

If, on the other hand, decoding is not successful, the processor 114 may then signal or allow the demodulator 112 and deinterleaver/decoder 118 to wait for the next pBCH0 OFDM symbol to arrive and continue demodulation (with the resultant symbols being combined with the symbols stored in the channel deinterleaver buffer 120), deinterleaving, and decoding until decoding has been determined to be successful, thus providing an incrementally redundant decoding.

In this way, the present apparatus of FIG. 1 may afford immediate demodulation and decoding of the pBCH0 channel and potentially may reduce the time required to decode pBCH0 by up to (P×2)−1 times in the a best optimized scenario. An example of such a scenario is where, if the mobile transceiver wakes up right after the first of 16 OFDM symbols (i.e., where P=16) that contains the pBCH0 packet (thus missing the first pBCH0 OFDM symbol), the conventional mobile transceiver described in the background section herein has to wait until the next starting pBCH0 OFDM symbol (i.e., 15 more superframes) and then acquire the subsequently following 16 pBCH0 OFDM symbols (16 superframes) for a total of 35 superframes. Given the same situation, the presently disclosed apparatus and methods, on the other hand, could potentially acquire and successfully decode the second or immediately subsequent pBCH0 OFDM symbol after the first missed symbol, thereby reducing decoding delay up to 35 times. This reduction in time may save additional processing resources, such as the resources of processor 114.

Those skilled in the art will appreciate that the above-described operation can alternatively be configured to start decoding after receiving an n number pBCH0 OFDM symbols where n<16, rather than immediately starting decoding with a first received pBCH0 OFDM symbol. In such an example, reduction in the latency is still achieved, but with somewhat increased reliability over the example given above where decoding is started with receipt of the first pBCH0 OFDM symbol.

It is further noted that processor 114 may include a memory device 128, which may be incorporated within the processor 114 or separate as shown in FIG. 1. The memory 128 is configured to store instructions utilized by the processor to effect the current scheme for demodulating and decoding the pBCH0 packets.

According to an example, the transceiver in FIG. 1 may be further configured to account for situations when decoding is not successful after a relatively large number of frames, such as in situations where a signal is very weak or much noise is present in the signals, as just a couple of examples. In these situations, the combined values in the deinterleaver buffer 120 of a number of pBCH0 coded symbols may become degraded. Thus, the transceiver (e.g., processor 114 or deinterleaver/decoder 118) may be configured to zero the values in the deinterleaver buffer 120 when a predetermined number N of pBCH0 OFDM symbols has been combined and yet decoding is still unsuccessful. In one example, the number N could be 16 symbols, i.e., the pBCH0 transmission period. It is also possible to choose N larger than 16. In that case the receiver has the potential of decoding pBCH0 in weaker signal environment as a result of more combining gain.

Figure 2:
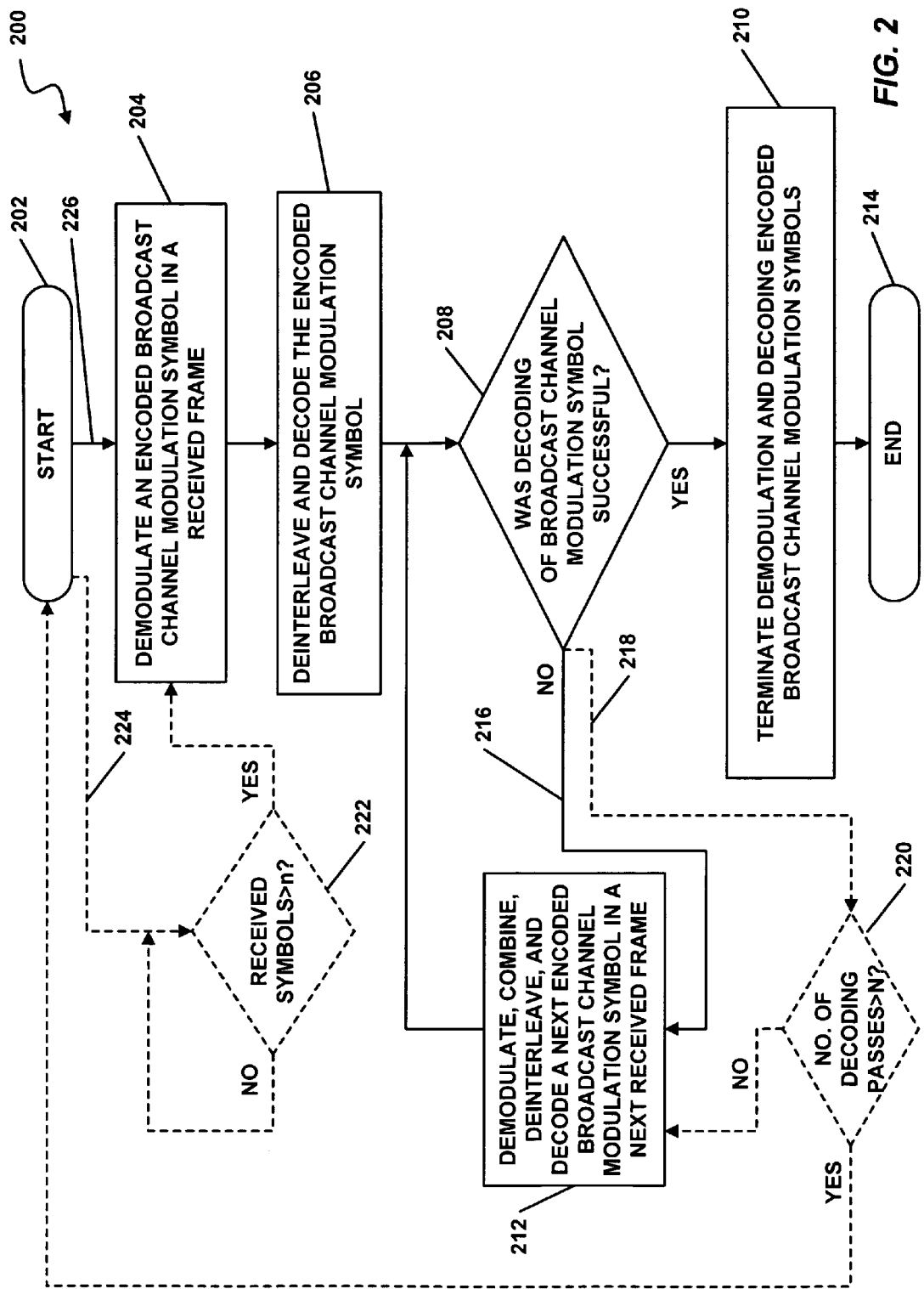
FIG. 2 is a flow diagram of an exemplary method for demodulating and decoding communication packet frame data.

FIG. 2 illustrates a method according to the present disclosure for demodulating and decoding pBCH0 packets in a transceiver device, such as transceiver 100 illustrated in FIG. 1, for example. The method 200 begins at an initialization or start block 202. It is noted that during initialization in block 202, the deinterleaver buffer 120 values may be zeroed and the transceiver waits to receive a broadcast channel modulation symbol (e.g., a pBCH0 packet).

After receipt of a symbol, flow then proceeds to block 204 where demodulation of an encoded broadcast channel modulation symbol, such as a pBCH0 packet, is performed. It is noted that this symbol may be contained within a received first frame or a frame subsequent. The process of block 204 may also include combining the demodulated symbols with symbols stored in the deinterleaver buffer (e.g., deinterleaver buffer 120 shown in FIG. 1). In the case where demodulation is immediately performed, the values in buffer 120 will be zero and combining the coded symbols with a zero value will, thus, simply yield the coded symbols. Alternatively, in the case where demodulation is configured to occur after an n number of received pBCH0 OFDM symbols, as illustrated by alternative block 224, shown with dashed lines and to be discussed later, the combined values in buffer 120 will change the data to be decoded. After the process of block 204, flow then proceeds to block 206 where deinterleaving and decoding of the encoded broadcast channel modulation symbol is performed It is noted that demodulator 112 shown in FIG. 1 may perform the operation in decision block 204, for example. Additionally, during the demodulation process of block 204, the processor 114 may direct resultant symbols output by demodulator 112 after demodulation to be combined with the symbols stored in the channel deinterleaver buffer 120 based on the coded symbol position, which is based on the current superframe pilot phase. It is noted, however, that as described previously, processor 114 and deinterleaver buffer 120 also are utilized in determining which superframe within the sequence of 16 superframes the first received frame comprises in order to properly perform decoding. As also described previously, this determination of the order of the first received frame within the sequence of 16 superframes is accomplished using the pilot phase information determined during initial acquisition. Additionally, deinterleaver/decoder 118 shown in FIG. 1 may perform the process of block 206.

After decoding in block 206, flow proceeds to decision block 208 where a determination is made whether the decoding of the broadcast channel modulation symbol was successful. As mentioned previously, this check may be performed by processor 114 using cyclic redundancy check (CRC) error detection or any other suitable method for determining error detection. If, at block 208, decoding is determined to be successful, flow then proceeds to block 210 and demodulation and decoding of the encoded broadcast channel modulation symbols (i.e., pBCH0 symbols) is terminated. Once demodulation and decoding is terminated at block 210 flow proceeds to block 214 for termination of process 200. It is noted that after the coding of the current pBCH0 packet is performed, decoding of pBCH1 packets are then started. Additionally decoding and demodulation of additional broadcast channel information such as pBCH1 may be initiated at block 210. It is noted that the processor 114 may be configured to execute the operation occurring at block 210, including signaling the demodulator 112 and deinterleaver/decoder 118 to begin processing pBCH1 symbols.

If decoding of the broadcast channel modulation symbol is determined to have failed at decision block 208, however, flow proceeds to block 212 where demodulation, deinterleaving, combining (such as was described in connection with deinterleaver buffer 120) and decoding of the encoded broadcast channel modulation symbol pBCH0 is performed for a next or subsequent received frame. Flow then proceeds back to decision block 208 to determine if this decoding is successful. Flow continues to loop to block 212 from decision block 208 and back to decision block 208 until modulation is determined to be successful. It is noted that this process of looping back (i.e., incremental redundancy decoding) would only be performed a maximum of 16 times as the modulation symbols come as discussed previously, are transmitted over 16 superframes; thus the acquisition of 16 superframes will ensure that the broadcast channel modulation symbol decoding will be successful.

It is noted that, as discussed above, when decoding is not successful after a relatively large number of frames, the deinterleaver buffer may again be zeroed out since the data stored therein may present errors due to too many decoding passes. Thus, FIG. 2 illustrates an alternative to portion of the process 200 to effect this functionality. In particular, flow would proceed from decision block 208 to decision block 220 when decoding is unsuccessful as indicated by dashed line 218, rather than directly to block 212 as indicated by line 216. A determination is made at block 220 whether a predetermined "N" number decoding passes has occurred. If the N number of decoding passes has not been exceeded, flow proceeds to block 212 and back to block 208. If the N number of decoding passes has been exceeded as determined at block 220, flow proceeds back to start block 202 where the deinterleaver buffer is zeroed out or cleared once again. Normally, N is chosen larger than 16 such that the receiver can decode under even worse channel conditions. Flow then proceeds to block 204 as described previously to begin demodulation and decoding.

As mentioned previously, the present disclosure also contemplates beginning demodulation and decoding of received broadcast channel symbols (e.g., pBCH0) after a predetermined number "n" symbols has first been received. Illustrative of this alternative, FIG. 2 also shows that after the start or initialization in block 202 wherein pBCH0 symbols are received, flow proceeds from block 202 to decision block 222 as indicated by dashed line 224. In this example, path 224 is in lieu of path 226 where block 204 occurs immediately subsequent to block 202.

At block 222 a determination is made whether the n predetermined number of symbols has been received. If not, flow loops back to block 222 until the n number of symbols have arrived. Once an n number of symbols is received, flow proceeds from block 222 to block 204 where the process 200 continues with demodulation and decoding as discussed above.

Figure 3:
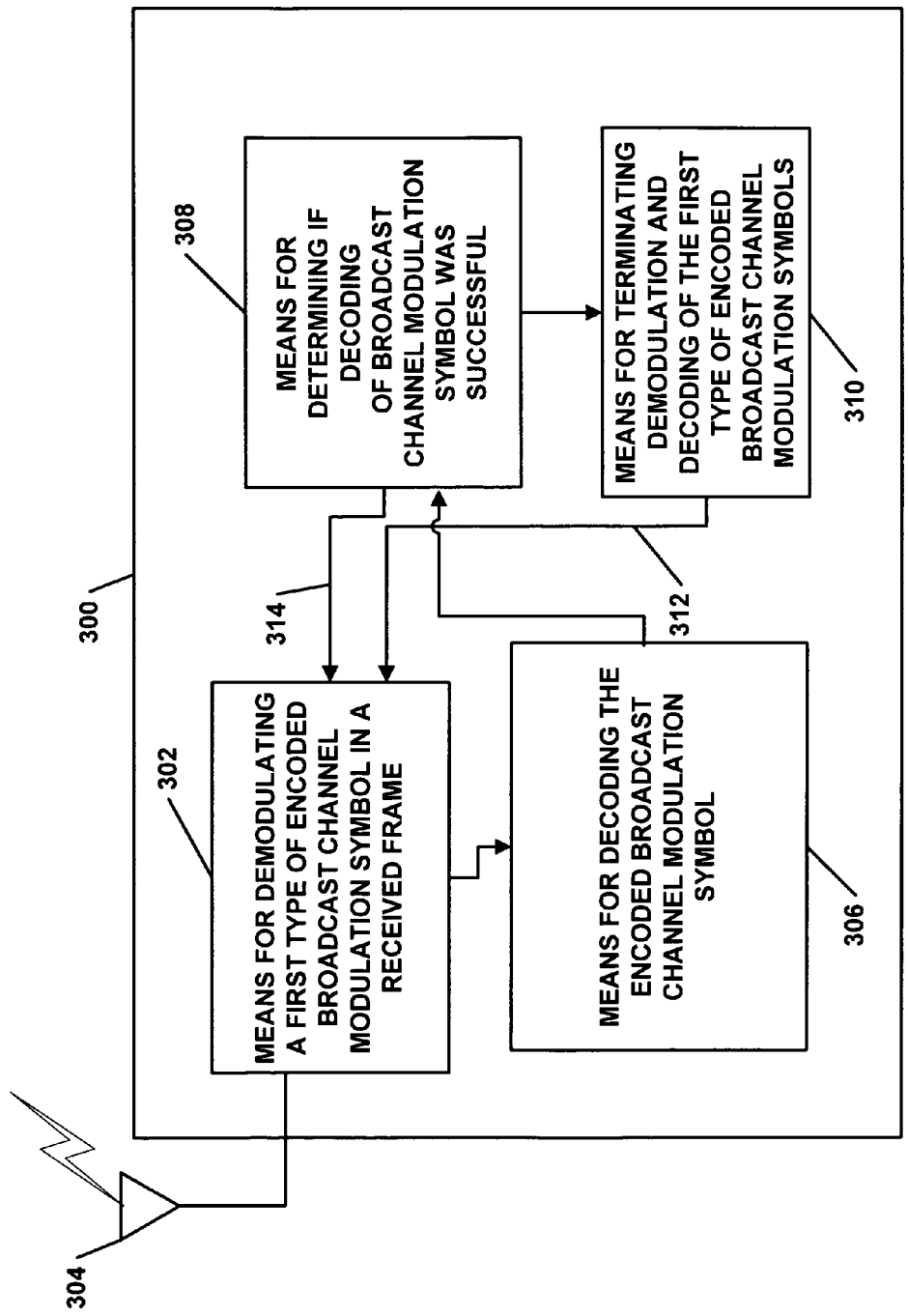
FIG. 3 is a block diagram of another exemplary transceiver that demodulates and decodes communication packet frame data according to the present disclosure.

FIG. 3 is a block diagram of another exemplary transceiver or processor used in a transceiver that demodulates and decodes communication packet frame data according to the present disclosure. As shown, the transceiver or processor for use in a transceiver 300 includes means 302 in communication with an antenna 304 receiving a communication signal. Means 302 is for demodulating at least a first type of encoded broadcast channel modulation symbol (e.g., a pBCH0 symbol) received in a frame of the communication signal. It is noted that means 302 may be implemented by at least the demodulator 112 illustrated in FIG. 1, as an example, or demodulator 112 in combination with processor 114.

Means 302 outputs a demodulated encoded broadcast modulation symbol to means 306 for decoding the first encoded broadcast channel modulation symbol. It is noted that means 306 may also deinterleave the encoded broadcast channel modulation symbol prior to decoding. As an example from FIG. 1, means 306 may be implemented by at least the deinterleaver/decoder 118 or a combination of the deinterleaver/decoder 118, deinterleaver buffer 120, and the processor 114.

Means 306 is in communication with means 308 for determining whether decoding of the first broadcast channel modulation symbol is successful. An exemplary implementation of means 308 may be processor 114, deinterleaver/decoder 118, or a combination thereof, as shown in FIG. 1. Means 308 is in communication with means 310 for terminating decoding of subsequent first type of broadcast channel modulation symbols (e.g., pBCH0) when decoding is determined to be successful. Processor 114 in FIG. 1, as an example, may be used to effect means 310. As shown in FIG. 3, means 310 is in communication with means 302 via a communication link 312 to signal the means for demodulating 302 to halt operation when decoding is successful. As further illustrated, means 308 is also in communication with means 302 via a communication link 314 to signal or allow means 302 to continue demodulation when decoding has been determined unsuccessful by mean 308.

The methods described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for decoding a communication signal comprising:
   demodulating at least a first type of encoded broadcast channel modulation symbol received in a first communication signal frame of a plurality of frames prior to receiving the entire plurality of frames, where each of the plurality of frames includes non-redundant data relative to each of the other plurality of frames and wherein each of the plurality of frames includes the first type of encoded broadcast channel modulation symbols;
   decoding the first type of encoded broadcast channel modulation symbol;
   determining whether decoding of the first type of broadcast channel modulation symbol is successful; and
   terminating decoding of subsequent broadcast channel modulation symbols of the first type of encoded broadcast symbol when decoding is determined to be successful.

2. The method as defined in claim 1, further comprising: continuing decoding of the first type of broadcast channel modulation symbols in at least one or more subsequent frames of the plurality of frames received after the first communication signal frame until decoding is determined to be successful.

3. The method as defined in claim 1, wherein decoding is determined to be successful when a cyclic redundancy check passes.

4. The method as defined in claim 1, wherein the first type of broadcast channel modulation symbol is a pBCH0 broadcast channel modulation symbol configured according to IEEE standard 802.20.

5. The method as defined in claim 1, further comprising: decoding a second type of broadcast channel modulation symbol after decoding of the first type of broadcast channel modulation symbol is determined to be successful.

6. The method as defined in claim 5, wherein the second broadcast channel is a pBCH1 broadcast channel configured according to IEEE standard 802.20.

7. The method as defined in claim 1, wherein the first broadcast modulated symbol is modulated according to QPSK modulation.

8. The method as defined in claim 1, further comprising: combining encoded symbols with coded signals in a deinterleaver buffer based on a symbol position of the encoded symbol based on a pilot channel phase after demodulating.

9. The method as defined in claim 8, wherein decoding further includes deinterleaving the combined encoded symbols in the deinterleaver buffer prior to decoding the encoded symbols.

10. The method as defined in claim 1, wherein the plurality of frames comprises 16 sequential frames.

11. The method as defined in claim 10, wherein the first communication signal frame is a first received frame in the 16 sequential frames.

12. The method as defined in claim 10, wherein the first communication signal frame is at least a second received frame in the 16 sequential frames.

13. A processor for decoding a communication signal, the processor configured to:
demodulate at least a first type of encoded broadcast channel modulation symbol received in a first communication signal frame of a plurality of frames prior to receiving the entire plurality of frames, where each of the plurality of frames includes non-redundant data relative to each of the other plurality of frames and wherein each of the plurality of frames includes the first type of encoded broadcast channel modulation symbols;
decode the first type of encoded broadcast channel modulation symbol;
determine whether decoding of the first type of broadcast channel modulation symbol is successful; and
terminate decoding of subsequent broadcast channel modulation symbols of the first type of encoded broadcast symbol when decoding is determined to be successful.

14. The processor as defined in claim 13, wherein the processor is further configured to continue decoding of the first broadcast channel modulation symbol in at least one or more subsequent frames received after the first frame until decoding is determined to be successful.

15. The processor as defined in claim 13, wherein the processor is further configured to determine that decoding is successful when a cyclic redundancy check passes.

16. The processor as defined in claim 13, wherein the first type of broadcast channel modulation symbol is a pBCH0 broadcast channel modulation symbol configured according to IEEE standard 802.20.

17. The processor as defined in claim 13, further configured to: decode a second type of broadcast channel modulation symbol after decoding of the first type of broadcast channel modulation symbol is determined to be successful.

18. The processor as defined in claim 17, wherein the second broadcast channel is a pBCH1 broadcast channel configured according to IEEE standard 802.20.

19. The processor as defined in claim 13, wherein the first broadcast modulated symbol is modulated according to QPSK modulation.

20. The processor as defined in claim 13, wherein the processor is further configured to combine encoded symbols with coded signals in a deinterleaver buffer based on a symbol position of the encoded symbol based on a pilot channel phase after demodulating.

21. The processor as defined in claim 20, wherein the processor is further configured to deinterleave the combined encoded symbols in the deinterleaver buffer prior to decoding the encoded symbols.

22. The processor as defined in claim 13, wherein the plurality of frames comprises 16 sequential frames.

23. The processor as defined in claim 22, wherein the first communication signal frame is a first received frame in the 16 sequential frames.

24. The processor as defined in claim 22, wherein the first communication signal frame is at least a second received frame in the 16 sequential frames.

25. A processor for use in a transceiver comprising:
means for demodulating at least a first type of encoded broadcast channel modulation symbol received in a first frame of a plurality of frames prior to receiving the entire plurality of frames, where each of the plurality of frames includes non-redundant data relative to each of the other plurality of frames and wherein each of the plurality of frames includes the first type of encoded broadcast channel modulation symbols;
means for decoding the first type of encoded broadcast channel modulation symbol;
means for determining whether decoding of the first broadcast channel modulation symbol is successful; and
means for terminating decoding of subsequent broadcast channel modulation symbols when decoding is determined to be successful.

26. The processor as defined in claim 25 further comprising:
means for continuing decoding of the first type of broadcast channel modulation symbol in at least one or more subsequent frames received after the first frame until decoding is determined to be successful.

27. The processor as defined in claim 25, wherein the means for determining whether decoding of the first broadcast channel modulation symbol is configured to determine decoding to be successful when a cyclic redundancy check passes.

28. The processor as defined in claim 25, wherein the first broadcast channel is a pBCH0 broadcast channel configured according to IEEE standard 802.20.

29. The processor as defined in claim 25, further comprising:
means for decoding a second broadcast channel modulation symbol after decoding of the first broadcast symbol is determined to be successful.

30. The processor as defined in claim 29, wherein the second broadcast channel is a pBCH1 broadcast channel configured according to IEEE standard 802.20.

31. The processor as defined in claim 25, wherein the first broadcast modulated symbol is modulated according to QPSK modulation.

32. The processor as defined in claim 25, wherein after demodulation, decoding includes combining encoded symbols with coded signals based on a symbol position of the encoded symbol based on a pilot channel phase.

33. The processor as defined in claim 25, wherein a predetermined number of frames each contain the first encoded channel modulation symbol.

34. The processor as defined in claim 25, wherein the plurality of frames comprises 16 sequential frames.

35. The processor as defined in claim 34, wherein the first frame is, a first received frame in the 16 sequential frames.

36. The processor as defined in claim 34, wherein the first frame is at least a second received frame in the 16 sequential frames.

37. A computer-readable medium encoded with a set of instructions, the instructions comprising:
an instruction for demodulating at least a first type of encoded broadcast channel modulation symbol received in a first communication signal frame of a plurality of frames prior to receiving the entire plurality of frames, where each of the plurality of frames includes non-redundant data relative to each of the other plurality of frames and wherein each of the plurality of frames includes the first type of encoded broadcast channel modulation symbols;
an instruction for decoding the first type of encoded broadcast channel modulation symbol;
an instruction for determining whether decoding of the first type of broadcast channel modulation symbol is successful; and an instruction for terminating decoding of subsequent broadcast channel modulation symbols of the first type of encoded broadcast symbol when decoding is determined to be successful.

38. The computer-readable medium as defined in claim 37, further comprising: an instruction for continuing decoding of the first broadcast channel modulation symbol in at least one or more subsequent frames received after the first frame until decoding is determined to be successful.

39. The computer-readable medium as defined in claim 37, wherein decoding is determined to be successful when a cyclic redundancy check passes.

40. The computer-readable medium as defined in claim 37, wherein the first broadcast channel is a pBCH0 broadcast channel configured according to IEEE standard 802.20.

41. The computer-readable medium as defined in claim 37, further comprising: an instruction for decoding a second broadcast channel modulation symbol after decoding of the first broadcast symbol is determined to be successful.

42. The computer-readable medium as defined in claim 41, wherein the second broadcast channel is a pBCH1 broadcast channel configured according to IEEE standard 802.20.

43. The computer-readable medium as defined in claim 37, wherein the first broadcast modulated symbol is modulated according to QPSK modulation.

44. The computer-readable medium as defined in claim 37, wherein after demodulation, decoding includes combining encoded symbols with coded signals based on a symbol position of the encoded symbol based on a pilot channel phase.

45. The computer-readable medium as defined in claim 37, wherein a predetermined number of frames each contain the first encoded channel modulation symbol.

46. The computer-readable medium as defined in claim 37, wherein the plurality of frames comprises 16 sequential frames.

47. The computer readable medium as defined in claim 46, wherein the first frame is a first received frame in the 16 sequential frames.

48. The computer readable medium as defined in claim 46, wherein the first communication signal frame is at least a second received frame in the 16 sequential frames.

* * * * *